(12) United States Patent
Staten

(10) Patent No.: US 10,610,718 B2
(45) Date of Patent: Apr. 7, 2020

(54) RECONFIGURABLE EXERCISE SYSTEM AND METHOD

(71) Applicant: Rogers Athletic Company, Inc., Clare, MI (US)

(72) Inventor: Kenneth Edward Staten, Clare, MI (US)

(73) Assignee: Rogers Athletic Company, Inc., Clare, MI (US)

( * ) Notice: Subject to any disclaimer, the term of this patent is extended or adjusted under 35 U.S.C. 154(b) by 0 days.

(21) Appl. No.: 16/267,574

(22) Filed: Feb. 5, 2019

(65) Prior Publication Data

US 2019/0240521 A1 Aug. 8, 2019

Related U.S. Application Data

(60) Provisional application No. 62/627,373, filed on Feb. 7, 2018.

(51) Int. Cl.
| | |
|---|---|
| *A63B 17/02* | (2006.01) |
| *A63B 23/12* | (2006.01) |
| *A63B 1/00* | (2006.01) |
| *A63B 17/04* | (2006.01) |
| *F16M 11/04* | (2006.01) |
| *A63B 22/00* | (2006.01) |
| *A63B 21/00* | (2006.01) |
| *A63B 21/055* | (2006.01) |
| *A63B 9/00* | (2006.01) |

(52) U.S. Cl.
CPC ............... *A63B 17/02* (2013.01); *A63B 1/00* (2013.01); *A63B 17/04* (2013.01); *A63B 23/1218* (2013.01); *A63B 9/00* (2013.01); *A63B 21/00047* (2013.01); *A63B 21/0552* (2013.01); *A63B 22/0046* (2013.01); *F16M 11/041* (2013.01)

(58) Field of Classification Search
CPC ....... A63B 17/02; A63B 23/1218; A63B 9/00; A63B 21/0552; A63B 21/00047; A63B 22/0046; A63B 1/00; A63B 17/04; F16M 11/041; E04B 2001/2409; E04B 2001/2469; E04B 2001/2445; E04B 1/2403; E04B 2001/2439
See application file for complete search history.

(56) References Cited

U.S. PATENT DOCUMENTS

| | | | | |
|---|---|---|---|---|
| 287,655 | A * | 10/1883 | French | A47G 25/0685 211/100 |
| 2,106,084 | A * | 1/1938 | Coddington | E04B 1/2403 52/376 |
| 2,469,208 | A * | 5/1949 | Rothrock | D06F 57/12 211/100 |

(Continued)

*Primary Examiner* — Ko H Chan
(74) *Attorney, Agent, or Firm* — Carlson, Gaskey & Olds, P.C.

(57) ABSTRACT

An exercise system according to an exemplary aspect of the present disclosure includes, among other things, a bar having a plurality of openings, and a plurality of holds a plurality of holds. Each hold within the plurality of holds having a handle. The handles of the plurality of holds each having differing geometries. Each of the holds is configured to be selectively received within at least one of the plurality of the openings to secure the hold relative to the bar.

18 Claims, 6 Drawing Sheets

(56) References Cited

U.S. PATENT DOCUMENTS

| | | | | |
|---|---|---|---|---|
| 4,241,914 A * | 12/1980 | Bushnell | ............... | A63B 1/00 |
| | | | | 482/130 |
| 4,660,331 A * | 4/1987 | Dahlen | ............... | E04B 5/43 |
| | | | | 52/283 |
| 4,921,245 A * | 5/1990 | Roberts | ............... | A63B 7/02 |
| | | | | 482/23 |
| 5,941,667 A * | 8/1999 | Hardison | ............... | B60P 7/15 |
| | | | | 410/143 |
| 6,547,704 B2 * | 4/2003 | Parrillo | ............... | A63B 23/035 |
| | | | | 482/94 |
| 7,736,286 B2 * | 6/2010 | Panaiotov | ............... | A63B 21/16 |
| | | | | 482/121 |
| 8,161,707 B2 * | 4/2012 | Simmons | ............... | E04B 1/24 |
| | | | | 52/648.1 |
| 10,100,516 B2 * | 10/2018 | Burt | ............... | E04B 1/003 |
| 2007/0032357 A1 * | 2/2007 | Piane, Jr. | ............... | A63B 1/00 |
| | | | | 482/142 |
| 2009/0249660 A1 * | 10/2009 | Brenize | ............... | E02D 27/02 |
| | | | | 37/407 |

* cited by examiner

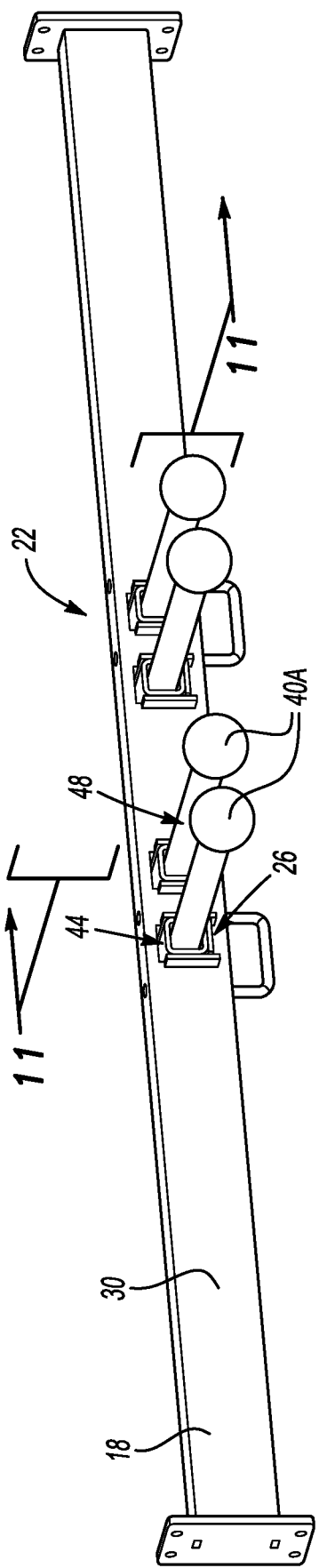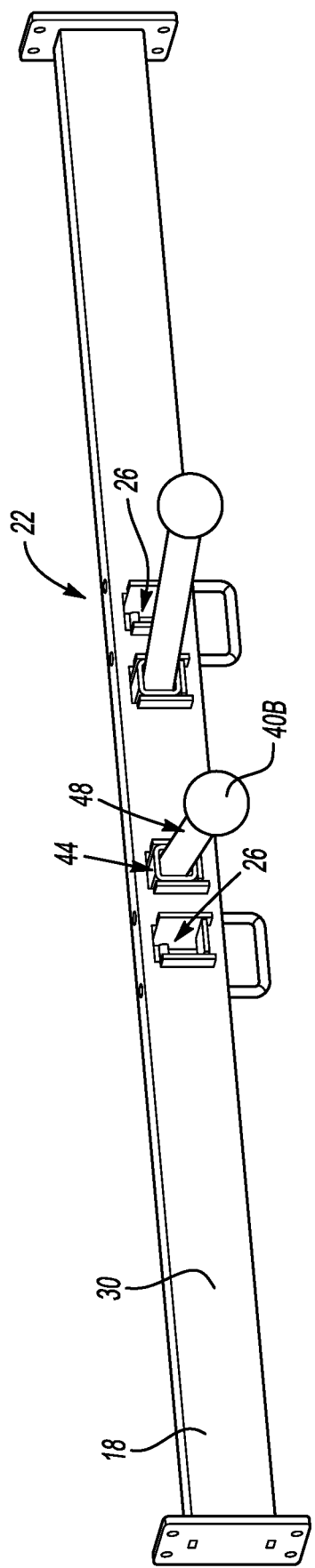

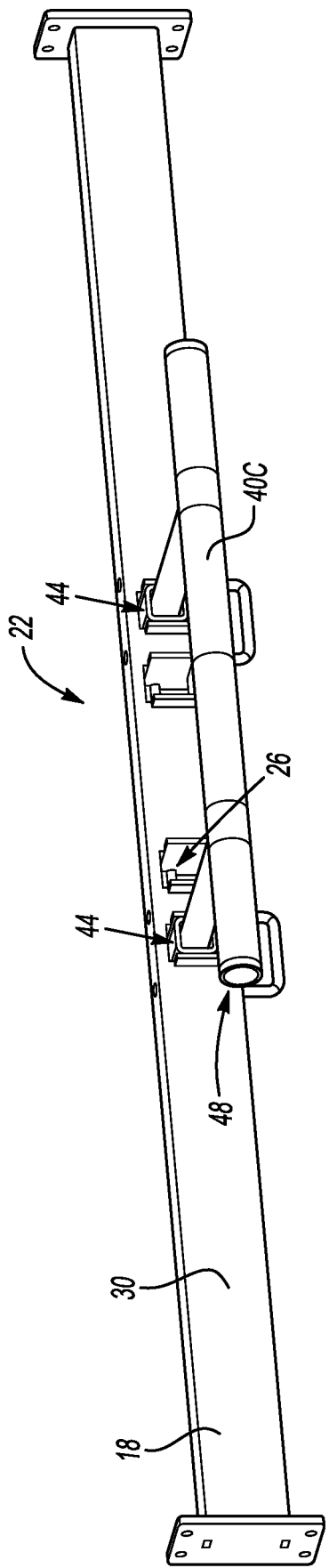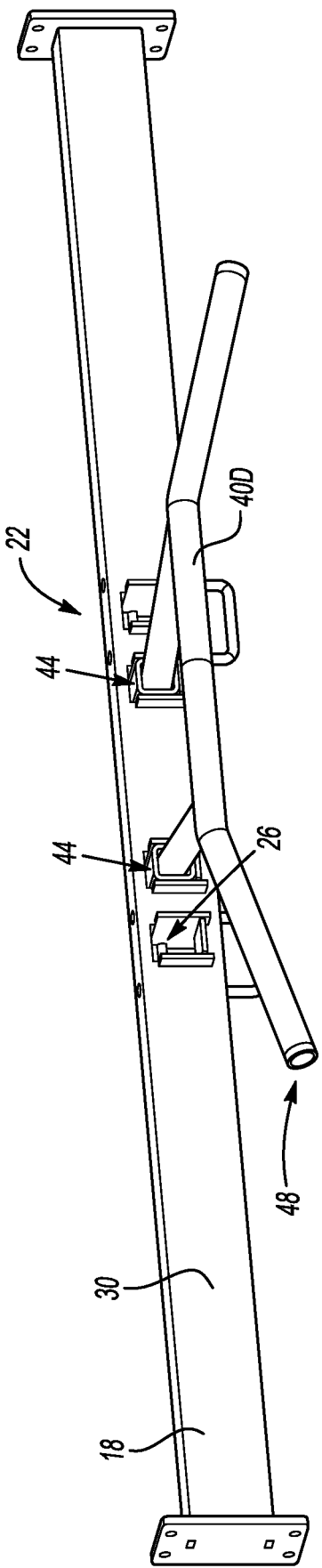

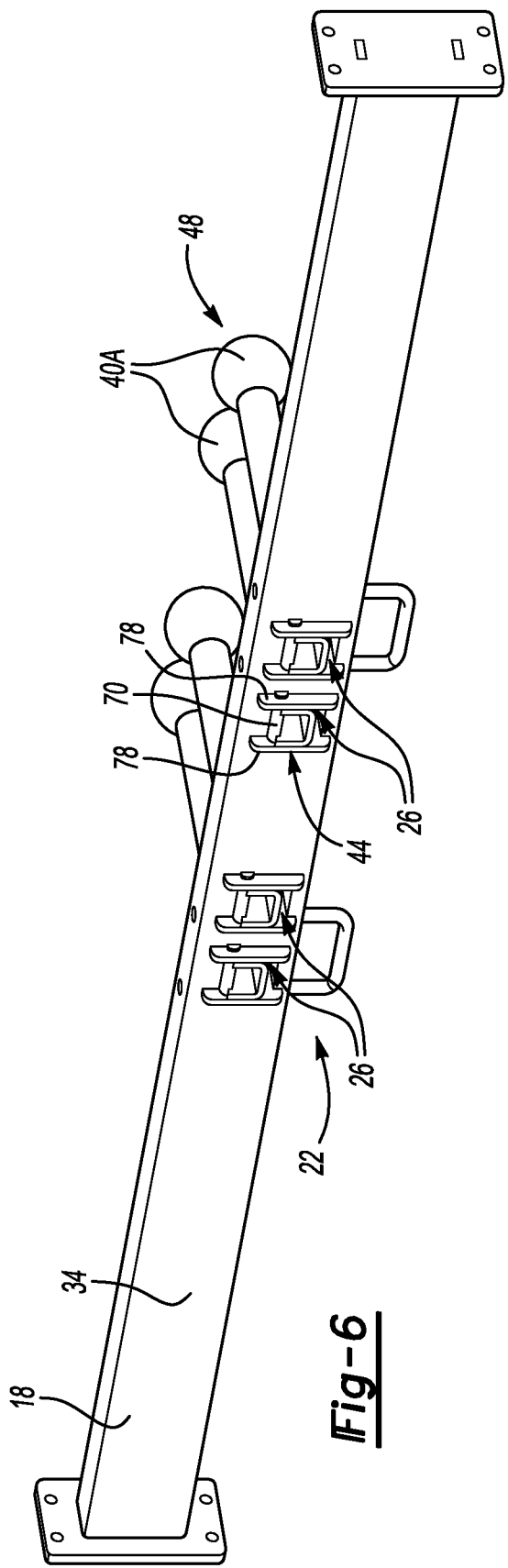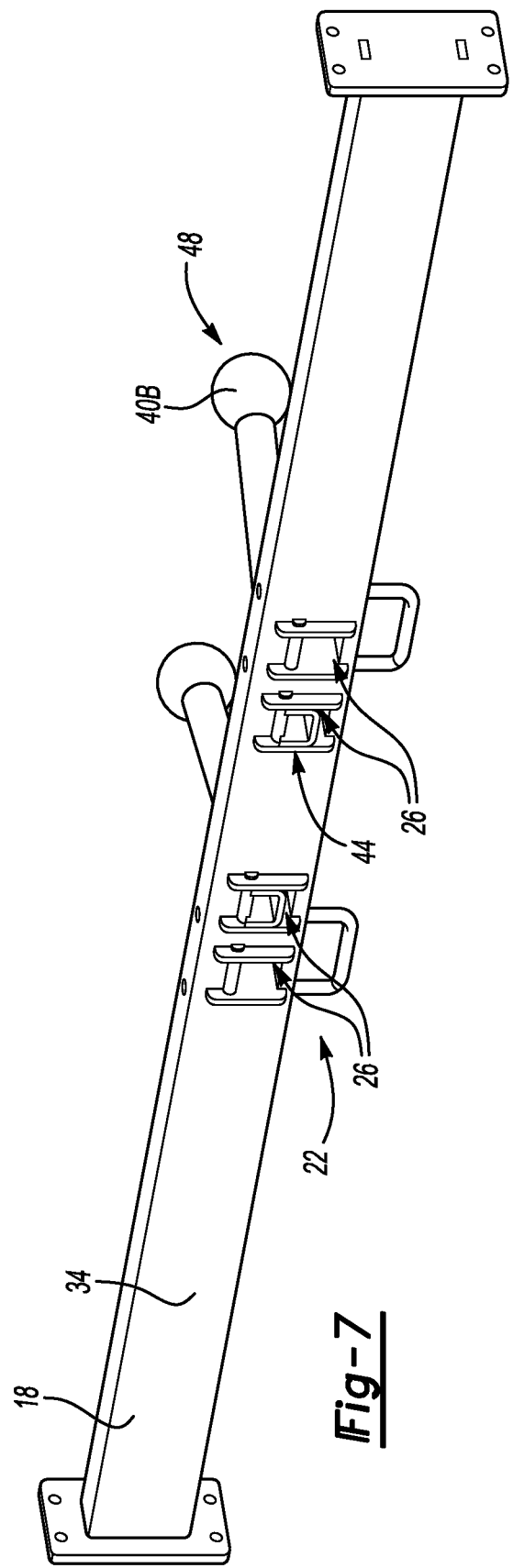

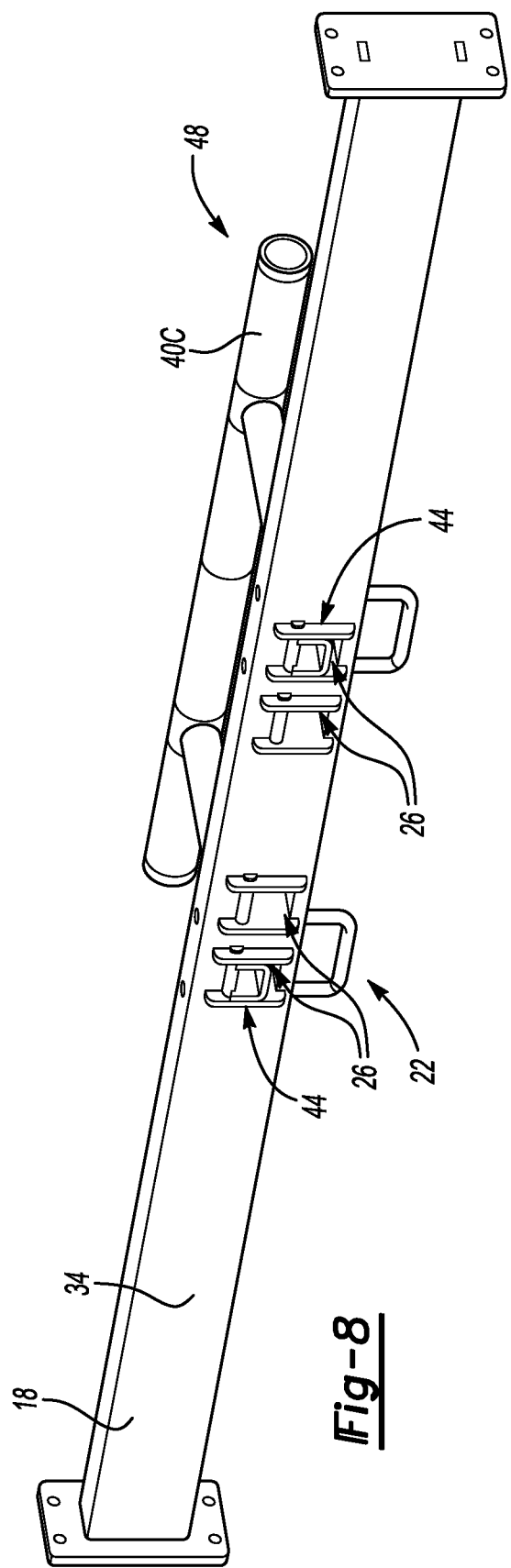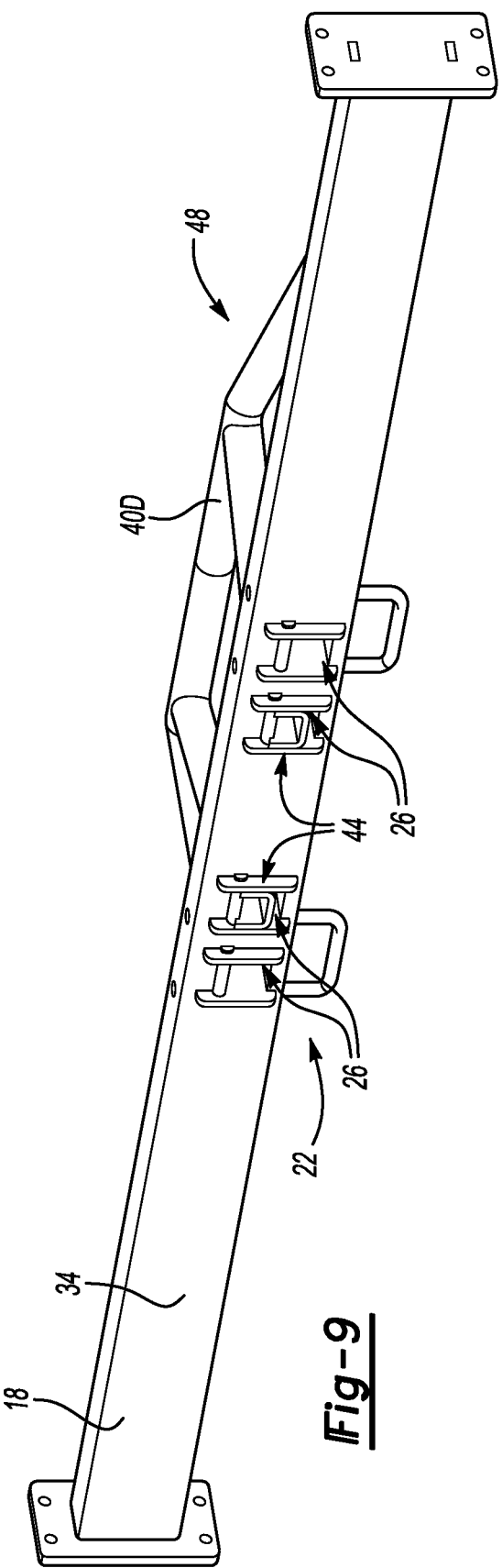

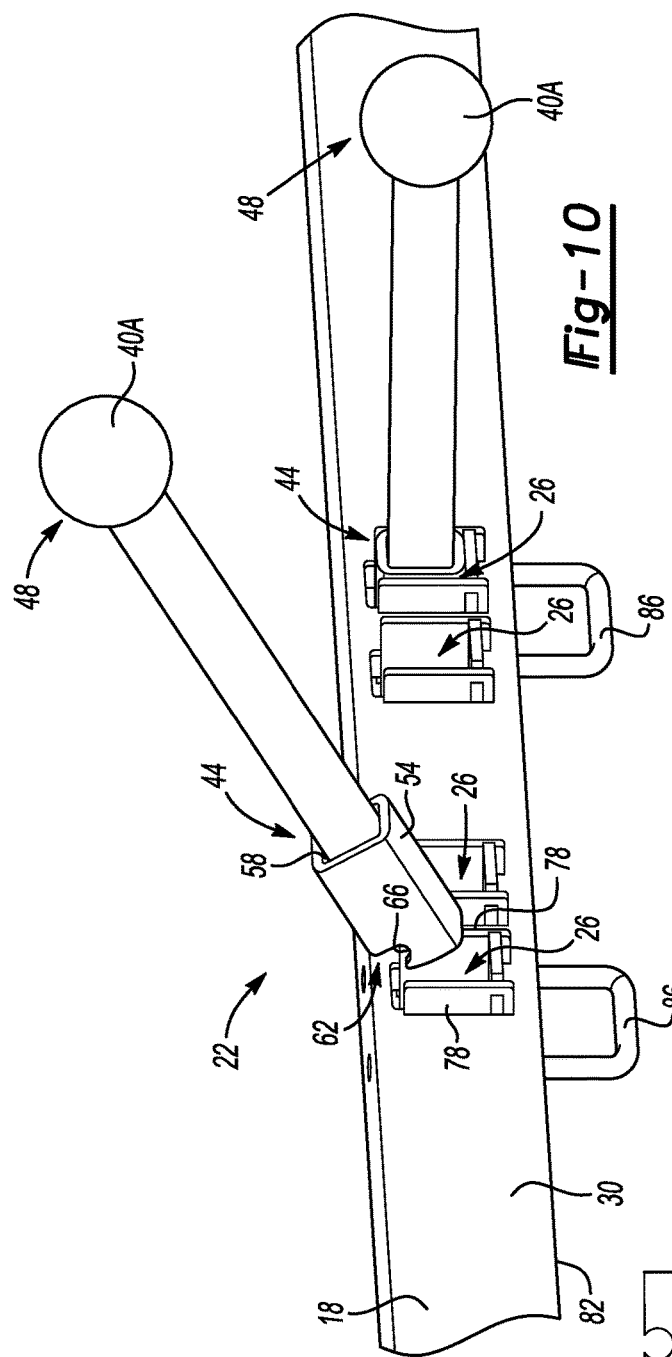
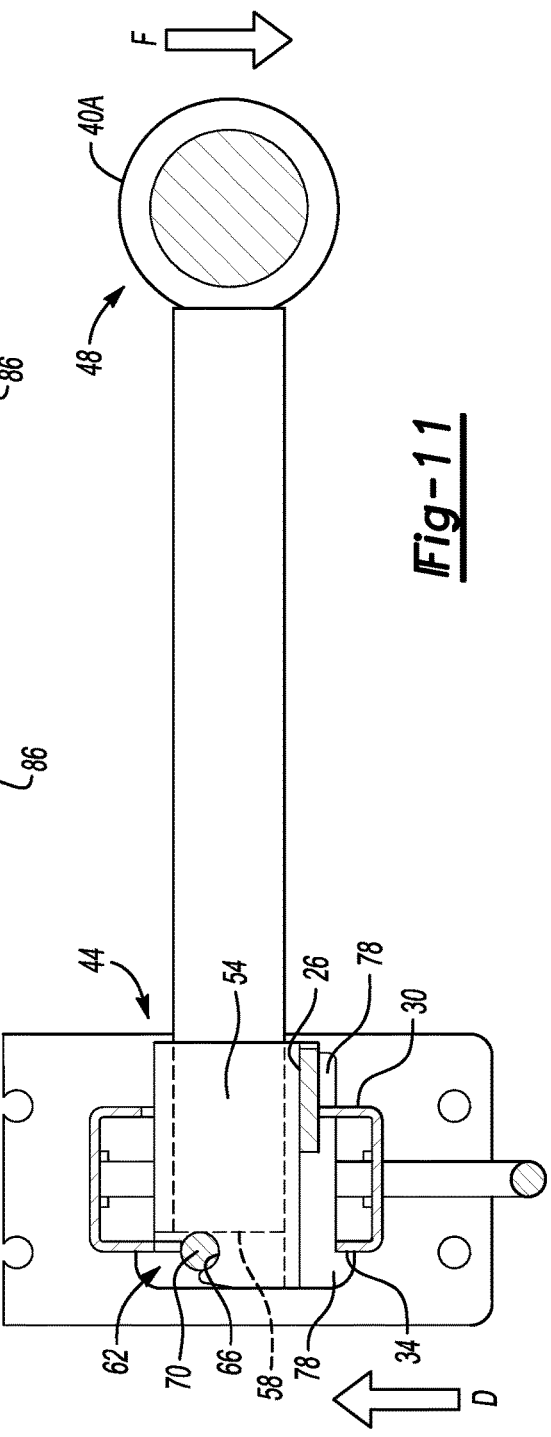

RECONFIGURABLE EXERCISE SYSTEM AND METHOD

CROSS-REFERENCE TO RELATED APPLICATIONS

This application claims priority to U.S. Provisional Application No. 62/627,373, which was filed on 7 Feb. 2018 and is incorporated herein by reference in its entirety.

TECHNICAL FIELD

This disclosure relates generally to equipment utilized for exercising. In particular, this disclosure relates to equipment utilized for pulling exercises, such as chin-ups and pull-ups that rely on an athlete's body weight to provide resistance. The equipment can be reconfigured for alternating between various pulling exercises, desired grips, etc.

BACKGROUND

Athletes and others can use exercises when training. Some exercises rely on resistance provided by machines or free weights, such as barbells. Other exercises instead, or additionally, rely on the athlete's body as resistance.

Pulling exercises include pull-ups and chin-ups. Pulling exercises can involve an athlete grasping an elevated structure and then pulling their body upward toward the structure. Other exercises include the athlete hanging from the elevated structure. Devices, such as bands, could be used to assist the athlete during pulling exercises. Weights could be added to the user to increase the resistance. Varying the configuration of the elevated structure can help the athlete target certain muscle groups or otherwise desirably vary the athlete's training.

SUMMARY

An exercise system according to an exemplary aspect of the present disclosure includes, among other things, a bar having a plurality of openings, and a plurality of holds. Each hold has a handle. The handles of the holds can have differing geometries. Each of the holds is configured to be selectively received within at least one of the plurality of openings to secure the hold relative to the bar.

Another exemplary embodiment of the foregoing exercise system includes a first rack and a second rack. The bar is elevated with respect to ground. The bar includes a first longitudinal end portion directly connected to the first rack and an opposing, second longitudinal end portion directly connected to the second rack.

In another exemplary embodiment of any of the foregoing exercise systems, each hold within the plurality of holds includes an engagement portion. The engagement portion is configured for receipt within one of the openings.

In another exemplary embodiment of any of the foregoing exercise systems, the engagement portion is a first engagement portion of a first hold within the plurality of holds, and the first hold further includes a second engagement portion. The first engagement portion is configured for receipt within a first opening within the plurality of openings of the bar when the second engagement portion is received within a second opening within the plurality of openings of the bar.

In another exemplary embodiment of any of the foregoing exercise systems, the first opening is separate and distinct from the second opening.

In another exemplary embodiment of any of the foregoing exercise systems, the engagement portions of the plurality of holds each mimic one another.

In another exemplary embodiment of any of the foregoing exercise systems, the engagement portions of the plurality of holds each include a collar disposed about a bar area. At least a portion of the collar and at least a portion of the bar area are received within the opening when the hold having the collar and the bar area is secured relative to the bar.

In another exemplary embodiment of any of the foregoing exercise systems, the engagement portions of the plurality of holds each include a collar disposed about a bar area. The collar is formed with a pair of hooks that are laterally spaced from one another. Each of the hooks is configured to receive a portion of the bar when the hold having the hooks is received within the opening and secured relative to the bar.

In another exemplary embodiment of any of the foregoing exercise systems, the portion of the bar received by the hooks is a rod extending across the opening in the bar.

In another exemplary embodiment of any of the foregoing exercise systems, each of the openings within the plurality of openings are reinforced by a plurality of flanges. The plurality of flanges protrude from a first primary side of the bar.

In another exemplary embodiment of any of the foregoing exercise systems, the plurality of flanges additionally protrude from a second primary side of the bar. The second primary side is opposite the first primary side.

Another exemplary embodiment of any of the foregoing exercise systems includes a rod that extends from a first flange on a first side of one of the openings to a second flange on an opposite second side of the one of the openings. The plurality of holds each include at least one hook configured to receive the rod when received within the one of the plurality of openings.

In another exemplary embodiment of any of the foregoing exercise systems, when the hold is received within at least one of the plurality of openings, a downward force applied to the handle of that hold urges at least one hook of that hold upward against a portion of the bar.

In another exemplary embodiment of any of the foregoing exercise systems, the portion of the bar is a rod extending along a vertical upper portion of the opening.

In another exemplary embodiment of any of the foregoing exercise systems, when the hold is received within at least one of the plurality of openings, the handle of that hold is configured to be grasped directly by a user to perform a pulling exercise.

An exercise system reconfiguration method according to another exemplary aspect of the present disclosure includes, among other things, inserting an engagement portion of a first hold into an opening of a bridge bar. The opening extends from a first primary side of the bridge bar to an opposite, second primary side of the bridge bar. The method further includes applying a downward force to a handle of the first hold. The downward force urges at least one hook of an engagement portion of the first hold upward against a portion of the bridge bar. The method further includes applying an upward force to the handle of the first hold to move the at least one hook away from the portion of the bridge bar, and withdrawing the engagement portion from the opening after the at least one hook is moved away from the portion of the bridge bar.

Another exemplary embodiment of the foregoing method includes, after the withdrawing, inserting an engagement portion of a second hold into the opening of the bridge bar. The engagement portion of the second hold mimics the engagement portion of the first hold. A handle of the second hold has a different configuration than the handle of the first hold.

Another exemplary embodiment of any of the foregoing methods includes guiding the inserting using a first flange disposed along a first side of the opening, and a second flange disposed along an opposite second side of the opening. The first and second flanges protrude from the first primary side of the bridge bar and from the second primary side of the bridge bar.

Another exemplary embodiment of any of the foregoing methods includes the portion of the bridge bar as a rod extending from the first flange to the second flange.

Another exemplary embodiment of any of the foregoing methods includes the bridge bar extending horizontally in a position vertically elevated with respect to ground. The bridge bar has a first longitudinal end portion directly connected to a first rack and an opposing, second longitudinal end portion directly connected to a second rack.

DESCRIPTION OF THE FIGURES

The various features and advantages of the disclosed examples will become apparent to those skilled in the art from the detailed description. The figures that accompany the detailed description can be briefly described as follows:

FIG. 2 illustrates a front view of the bridge bar of FIG. 1 accommodating first types of holds within the reconfigurable exercise area.

FIG. 3 illustrates a front view of the bridge bar of FIG. 1 accommodating second types of holds within the reconfigurable exercise area.

FIG. 4 illustrates a front view of the bridge bar of FIG. 1 accommodating third types of holds within the reconfigurable exercise area.

FIG. 5 illustrates a front view of the bridge bar of FIG. 1 accommodating fourth types of holds within the reconfigurable exercise area.

FIGS. 6-9 illustrate rear views of FIGS. 2-5, respectively.

FIG. 10 illustrates a perspective view of the bridge bar having one of the first holds in an engaged position with the reconfigurable exercise area and another of the first holds in a disengaged position.

FIG. 11 illustrates a section view taken along line 11-11 in FIG. 2.

DETAILED DESCRIPTION

Figure 1:
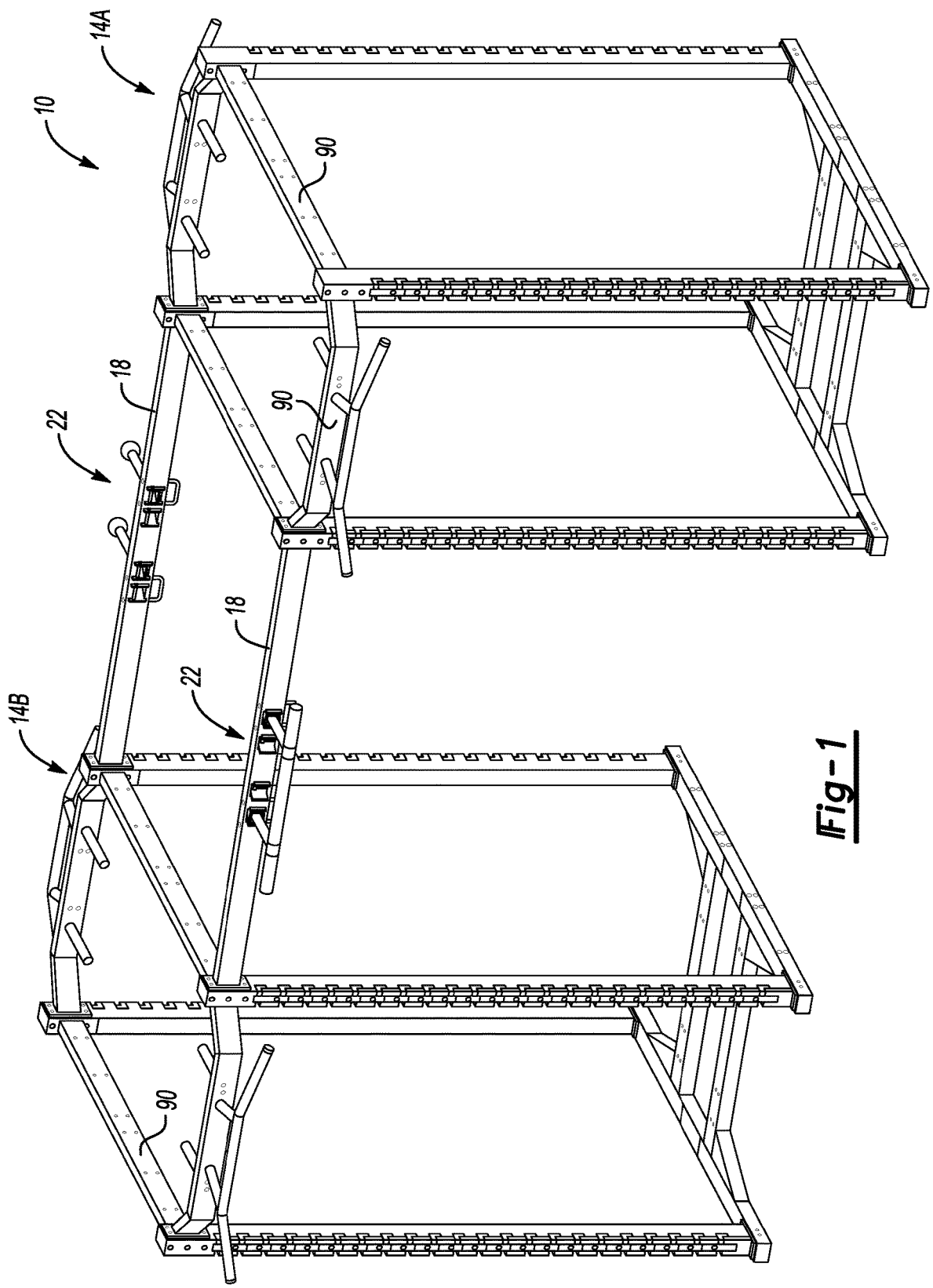
FIG. 1 illustrates an exercise system incorporating a bridge bar having a section with a reconfigurable exercise area.

This disclosure relates generally to pulling and hanging exercises and, more particularly, to a reconfigurable pulling exercise area that can accommodate a variety of different holds. An athlete can interchange the holds as required to facilitate training different areas of their body or for other reasons.

Referring to FIG. 1, an exercise system 10 according to an exemplary aspect of the present disclosure includes a first rack 14A, a second rack 14B, and a pair of bridge bars 18 extending therebetween. The bridge bars 18 are vertically elevated with respect to ground. Vertical, for purposes of this disclosure, is with reference to the ground and ordinary orientation of the exercise system in use.

A first longitudinal end portion of each bridge bar 18 is directly connected to the first rack 14A. A second longitudinal end portion of each bridge bar 18 is directly connected to the second rack 14B. The bridge bars 18 thus span from the first rack 14A to the second rack 14B. Although the bridge bar 18 is shown as connected to the first rack 14A and the second rack 14B, the bridge bar 18 could connect to other structures, such as a wall or another type of rack.

The bridge bars 18, with reference to FIGS. 2-9 and continuing reference to FIG. 1, each includes a reconfigurable exercise area 22. Generally, the reconfigurable exercise area 22 in the exemplary embodiments includes a plurality of openings 26 within the bridge bar 18. The example openings 26 extend horizontally from a first primary side 30 of the bridge bar 18 to an opposite, second primary side 34 of the bridge bar 18.

The openings 26 can accommodate a variety of holds. Examples of the holds can include the holds 40A of FIGS. 2 and 6, the holds 40B of FIGS. 3 and 7, the hold 40C of FIGS. 4 and 8, and the hold 40D of FIGS. 5 and 9. The holds 40A-40D are each configured for insertion into the openings 26 to secure the holds 40A-40D in an engaged position to the bridge bar 18. The holds 40A-40D can be used for pulling and hanging exercises.

The holds 40A-40D each include at least one engagement portion 44 and a handle 48. When one of the holds 40A-40D is engaged with the bridge bar 18, the engagement portion 44 is received within one of the openings 26. Some of the holds 40C, 40D include another engagement portion 44 received within another of the openings 26.

The engagement portions 44 of the holds 40A-40D are substantially common across the different types of holds 40A-40D. That is, the geometries of the engagement portions 44 all mimic each other and are nominally the same. The openings 26 within the bridge bar 18 each have a geometry that is nominally the same. Accordingly, the openings 26 can be used to selectively accommodate different ones of the holds 40A-40D, or other varieties of holds (not shown) having an engagement portion sized similarly to the engagement portion 44.

In a first exemplary configuration shown in FIGS. 2 and 6, each of the openings 26 receives the engagement portion 44 from one of the four holds 40A. The holds 40A extend perpendicularly from the second primary side 34 when engaged with the bridge bar 18.

In a second exemplary configuration shown in FIGS. 3 and 7, two of the openings 26 each receive the engagement portion 44 from one of the two holds 40B. The holds 40B extend at an angle to the second primary side 34 when engaged with the bridge bar 18.

In a third exemplary configuration shown in FIGS. 4 and 8, the hold 40C is a type of chin-up/pull-up bar. One of the openings 26 receives one of the engagement portions 44 of the hold 40C. Another of the openings 26 receives the other of the engagement portions 44 of the hold 40C.

In a fourth exemplary configuration shown in FIGS. 5 and 9, the hold 40D is another type of chin-up/pull-up bar. The hold 40D includes two separate engagement portions 44. One of the openings 26 receives one of the engagement portions 44 of the hold 40D. Another of the openings 26 receives the other of the engagement portions 44 of the hold 40D.

In any of the above configurations, a user can grasp the holds 40A-40D to perform, for example, pull-up exercises, chin-ups, hangs, etc.

In the exemplary embodiments, the engagement portions 44 of the holds 40A-40D are similar to the engagement portion 44 shown in connection with the holds 40A of FIGS. 10 and 11.

The exemplary engagement portion 44 includes a collar 54 disposed about a bar area 58 of the hold 40A. The collar 54 has a generally rectangular profile. A portion of the collar 54 and a portion of the bar area 58 are received within the opening 26 when the hold 40A is in an engaged position.

An upper aft end portion 62 of the collar 54 is formed with a pair of laterally spaced hooks 66—one hook 66 is within each of the sidewalls of the collar 54, in this example. When the hold 40A is engaged with the bridge bar 18 as shown in FIG. 11, the hooks 66 receive a portion 70 of the bridge bar 18. In this example, the portion 70 is a rod extending across the opening 26 where the opening 26 opens to the second primary side 34 of the bridge bar 18.

When a user is exercising and applies a downward force F to the handle 48 of the hold 40A, the hooks 66 are urged upward against the portion 70 in a direction D. This secures the hold 40A as the engagement portion 44 is unable to be withdrawn from the opening 26 due to, among other things, the hooks 66 being forced against the portion 70.

To remove the hold 40A from the opening 26 after exercising or for reconfiguring the reconfigurable exercise area 22, the user can apply an upward force to the handle 48, which rotates the hooks 66 away from the portion 70 so that hold 40A can be withdrawn from the opening 26.

In the exemplary embodiment of the bridge bar 18, the openings 26 are reinforced by a plurality of flanges 78. The flanges protrude from the first primary side 30 and the second primary side 34 of the bridge bar 18, which can facilitate aligning the engagement portions 44 during insertion and removal of the holds 40A-40D.

In this example, two of the flanges 78 extending from the second primary side 34 of the bridge bar 18 help to hold opposite ends of the rod providing the portion 70 of the bridge bar 18 that is received within the hooks 66 (see FIG. 6). In particular, a pair of the flanges 78 can each include an opening that receives part of the rod.

A bottom side 82 of the bridge bar 18 is, in this example, equipped with a pair of hooks 86 (see FIG. 10). The hooks 86 are not configured for removal from the bridge bar 18 in this example. The hooks 86 can be used as an anchor point for exercises, or for attaching an assistance device to aid the user during pulling exercises that utilize the holds 40A-40D.

The bridge bar 18 includes the reconfigurable exercise area 22 in this example. In another example, the reconfigurable exercise area is incorporated into another elevated structure, such as a upper support beam 90 of the first rack 14A or the second rack 14B Features of the disclosed examples can include an exercise area that can be reconfigured by swapping various types of holds within a plurality of openings defined within an exercise system.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An exercise system, comprising:
   a bar having a plurality of openings; and
   a plurality of holds, each hold within the plurality of holds having a handle, the handles of the plurality of holds each having differing geometries, each hold within the plurality of holds configured to be selectively received within at least one of the plurality of the openings to secure the hold relative to the bar,
   wherein each of the openings within the plurality of openings are reinforced by a plurality of flanges, the plurality of flanges protruding from a first primary side of the bar.

2. The exercise system of claim 1, further comprising a first rack and a second rack, the bar elevated with respect to ground, the bar including a first longitudinal end portion directly connected to the first rack and an opposing, second longitudinal end portion directly connected to the second rack.

3. The exercise system of claim 1, wherein each hold within the plurality of holds includes an engagement portion, the engagement portion configured for receipt within one of the openings.

4. The exercise system of claim 3, wherein the engagement portion is a first engagement portion of a first hold within the plurality of holds, and the first hold further includes a second engagement portion, the first engagement portion configured for receipt within a first opening within the plurality of openings of the bar when the second engagement portion is received within a second opening within the plurality of openings of the bar.

5. The exercise system of claim 4, wherein the first opening is separate and distinct from the second opening.

6. The exercise system of claim 3, wherein engagement portions of the plurality of holds each mimic one another.

7. The exercise system of claim 1, wherein the engagement portions of the plurality of holds each include a collar and a bar area, wherein the collar is disposed about the bar area, wherein at least a portion of the collar and at least a portion of the bar area are received within the opening when the hold having the collar and the bar area is secured relative to the bar.

8. An exercise system, comprising:
   a bar having a plurality of openings; and
   a plurality of holds, each hold within the plurality of holds having a handle, the handles of the plurality of holds each having differing geometries, each hold within the plurality of holds configured to be selectively received within at least one of the plurality of the openings to secure the hold relative to the bar,
   wherein the engagement portions of the plurality of holds each include a collar disposed about a bar area, the collar formed with a pair of hooks that are laterally spaced from one another, each of the hooks configured to receive a portion of the bar when the hold having the hooks is received within the opening and secured relative to the bar.

9. The exercise system of claim 8, wherein the portion of the bar received by the hooks is a rod extending across the opening in the bar.

10. The exercise system of claim 1, wherein the plurality of flanges additionally protrude from a second primary side of the bar, the second primary side opposite the first primary side.

11. The exercise system of claim 10, further comprising a rod that extends from a first flange on a first side of one of the plurality of openings, to a second flange on an opposite second side of the one of the plurality of openings, wherein the plurality of holds each include at least one hook configured to receive the rod when received within the one of the plurality of openings.

12. An exercise system, comprising:
   a bar having a plurality of openings; and
   a plurality of holds, each hold within the plurality of holds having a handle, the handles of the plurality of holds each having differing geometries, each hold within the plurality of holds configured to be selectively received within at least one of the plurality of the openings to secure the hold relative to the bar wherein each hold within the plurality of holds has at least one hook, wherein, when the hold is received within at least one of the plurality of openings, a downward force applied to the handle of that hold urges at least one hook of that hold upward against a portion of the bar.

13. The exercise system of claim 12, wherein the portion of the bar is a rod extending along a vertical upper portion of the opening.

14. The exercise system of claim 1, wherein, when the hold is received within at least one of the plurality of openings, the handle of that hold is configured to be grasped directly by a user to perform a pulling exercise.

15. An exercise system reconfiguration method, comprising:

inserting an engagement portion of a first hold into an opening of a bridge bar, the opening extending from a first primary side of the bridge bar to an opposite, second primary side of the bridge bar;

guiding the inserting using a first flange disposed along a first side of the opening, and a second flange disposed along an opposite second side of the opening, the first and second flanges protruding from the first primary side of the bridge bar and from the second primary side of the bridge bar;

applying a downward force to a handle of the first hold, the downward force urging at least one hook of the engagement portion of the first hold upward against a portion of the bridge bar;

applying an upward force to the handle of the first hold to move the at least one hook away from the portion of the bridge bar; and withdrawing the engagement portion from the opening after the at least one hook is moved away from the portion of the bridge bar.

16. The exercise system reconfiguration method of claim 15, further comprising, after the withdrawing, inserting an engagement portion of a second hold into the opening of the bridge bar, the engagement portion of the second hold mimicking the engagement portion of the first hold, a handle of the second hold having a different configuration than the handle of the first hold.

17. The exercise system reconfiguration method of claim 15, wherein the portion of the bridge bar is a rod extending from the first flange to the second flange.

18. The exercise system reconfiguration method of claim 15, wherein the bridge bar extends horizontally in a position vertically elevated with respect to ground, the bridge bar having a first longitudinal end portion directly connected to a first rack and an opposing, second longitudinal end portion directly connected to a second rack.

* * * * *